United States Patent

[11] 3,566,134

| [72] | Inventors | Derek Peat;<br>Richard William Bucknell Sutton,<br>Nottingham, England |
|---|---|---|
| [21] | Appl. No. | 838,222 |
| [22] | Filed | July 1, 1969 |
| [45] | Patented | Feb. 23, 1971 |
| [73] | Assignee | National Research Development Corporation<br>London, England |
| [32] | Priority | July 2, 1968 |
| [33] | | Great Britain |
| [31] | | 31609/68 |

[54] DEVICE FOR MEASURING STITCH LENGTH
13 Claims, 5 Drawing Figs.

[52] U.S. Cl. ............................................ 250/215,
324/172, 66/80
[51] Int. Cl. ...................................... D04b 11/00
[50] Field of Search ................................. 250/219
(Lg), 219 (S), 215; 66/82 (S), 77; 356/159, 160;
324/70 (B), 69, 172, 71, 179

[56] References Cited
UNITED STATES PATENTS

| 2,199,396 | 5/1940 | Dubilier | 66/82 |
|---|---|---|---|
| 2,220,807 | 11/1940 | Stout et al. | 66/82 |
| 2,989,690 | 6/1961 | Cook | 324/69X |
| 3,303,419 | 2/1967 | Gith | 324/71 |
| 3,307,164 | 2/1967 | Zimmer | 324/70 |
| 3,508,066 | 4/1970 | Agar | 324/70X |

*Primary Examiner*—Walter Stokwein
*Attorney*—Cushman, Darby & Cushman

ABSTRACT: A device for measuring the length of a stitch formed in a fully fashioned or Jacquard knitting machine by creating electrostatic marks on the yarn and detecting the passage of the marks through a detector. The passage of a mark through the detector causes the creation of a further mark. The detector comprises a plurality of electrically-conductive members uniformly spaced apart in the direction of movement of the yarn. The members are electrically connected to one another and the change in potential of the members upon passage of a mark past the members is used as a signal to a counter. The distance between the point of creation of the mark and the first detector member is equal to or a multiple of the distance between adjacent detector members.

PATENTED FEB23 1971 3,566,134

DEVICE FOR MEASURING STITCH LENGTH

This invention relates to devices for measuring relative movement between an elongate electrically-nonconductive member and a body.

In knitting machines it is desirable to know the stitch length, that is, the length of yarn in each stitch.

Proposals have been made for measuring the yarn fed to the needles, which proposals involve the use of wheels in frictional engagement with the yarn. However, such arrangements have the disadvantage that the yarn is subjected to unnecessary tensions, in part due to the inertia of the wheels and other rotary parts.

Proposals have also been made for applying an electrostatic charge pattern to a yarn and detecting the applied charge at a location spaced from the location of charge application and comparing the phase or frequency of the detected charge waveform with that given by a yarn running at known velocity.

It is an object of the present invention to provide a simple yarn measuring device which will operate satisfactorily regardless of changes in yarn velocity.

According to the present invention there is provided a device for measuring relative movement between an elongate electrically-nonconductive member and a body, said body including an applicator for applying discrete regions of electrostatic charge on the elongate member, a charge detector disposed in applied-charge-sensing relationship with the elongate member and adapted to detect charges applied to the elongate member as they pass the detector, said detector comprising a plurality of discrete electrically-conductive members uniformly spaced in the direction of relative movement, the distance between the charge applicator and the nearer or nearest of the electrically-conductive members being equal to or an integral multiple of the distance between adjacent electrically-conductive members, the electrically-conductive members being electrically connected to one another, the charge applicator being energized to apply a charge upon detection of an applied charge by the detector, and means adapted to derive signals from the change in potential of the electrically-conductive members upon passage of applied charges past the electrically-conductive members for counting the number of charges passing the detector.

In one embodiment of the present invention, the elongate electrically-nonconductive member is a yarn and the body is a part of a knitting machine.

The detector may be of tubular form through which the elongate member, e.g. the yarn runs and in this case it may include a tube of insulating material having at its exterior an earthed sheath of electrically-conducting material and at its interior the discrete electrically-conductive members which are in the form of rings coaxial with the tube. The tube, sheath and rings may be split in a direction parallel to the axis of the tubular form of the detector to readily allow the detector to be placed about and withdrawn from the elongate member.

Alternatively the charge detector may comprise a curved, earthed metal plate and the discrete electrically-conductive members may be, in this case, strips disposed at the convex side of and insulated from the earth metal plate.

The charge applicator may comprise two electrodes, one of which, preferably, is a cylinder and earthed, being spaced from the other which, preferably, is pointed, the plane containing the axis of the cylindrical electrode and the tip of the pointed electrode being generally normal to the longitudinal axis of the elongate electrically-nonconductive member. Preferably, a third electrode is provided which is connected to earth through a resistance and is so disposed relative to the pointed electrode as to cause, in operation, a discharge between the pointed and third electrodes whereby the region of the atmosphere around the pointed electrode is ionized when the potential of the pointed electrode is raised for applying a charge.

The means adapted to derive signals from the change in potential of the electrically-conductive members may comprise an amplifier, the input of which is connected to the electrically-conductive members and the output signal from which is fed to a counter.

There may be two series of discrete electrically-conductive members, the members of the two series being disposed in alternate sequence, the members of each series being electrically connected, the two series of members being connected one to each input of a differential amplifier the output of which is fed to a counter.

Between the amplifier and the counter there may be means for converting a sine wave output of the amplifier into a rectangular waveform and means for differentiating the rectangular waveform into a series of voltage pulses which are then passed through a full wave rectifier to the counter.

The output of the counter may be fed to a readout and/or means for correcting a discrepancy between the measured value and a required value.

When apparatus in accordance with the present invention is for use in a fully fashioned knitting machine, the signal to the counter may be controlled by a gate which receives an opening and closing signal from a photoelectric cell between which and a light source an opaque screen, mounted on the slur bar, passes during a portion of the traverse of the slur bar. The gate is caused to open when the source becomes obscured from the p.e. cell and closes when the source becomes apparent to the p.e. cell. Thus, the counter only counts during the formation of a known number of stitches and the screen is so disposed on the slur bar that the length of yarn which passes the detector during the time in which the light source is obscured from the cell is approximately equal to the length of yarn which is formed into stitches during that time.

When apparatus in accordance with the present invention is for use in a Jacquard machine, the signal to the counter may be controlled by a gate which receives an opening and closing signal from a microswitch which is triggered at predetermined stages in the knitting cycle.

Embodiments of the present invention will now be described, by way of example, with reference to the accompanying drawings in which.

Figure 1:
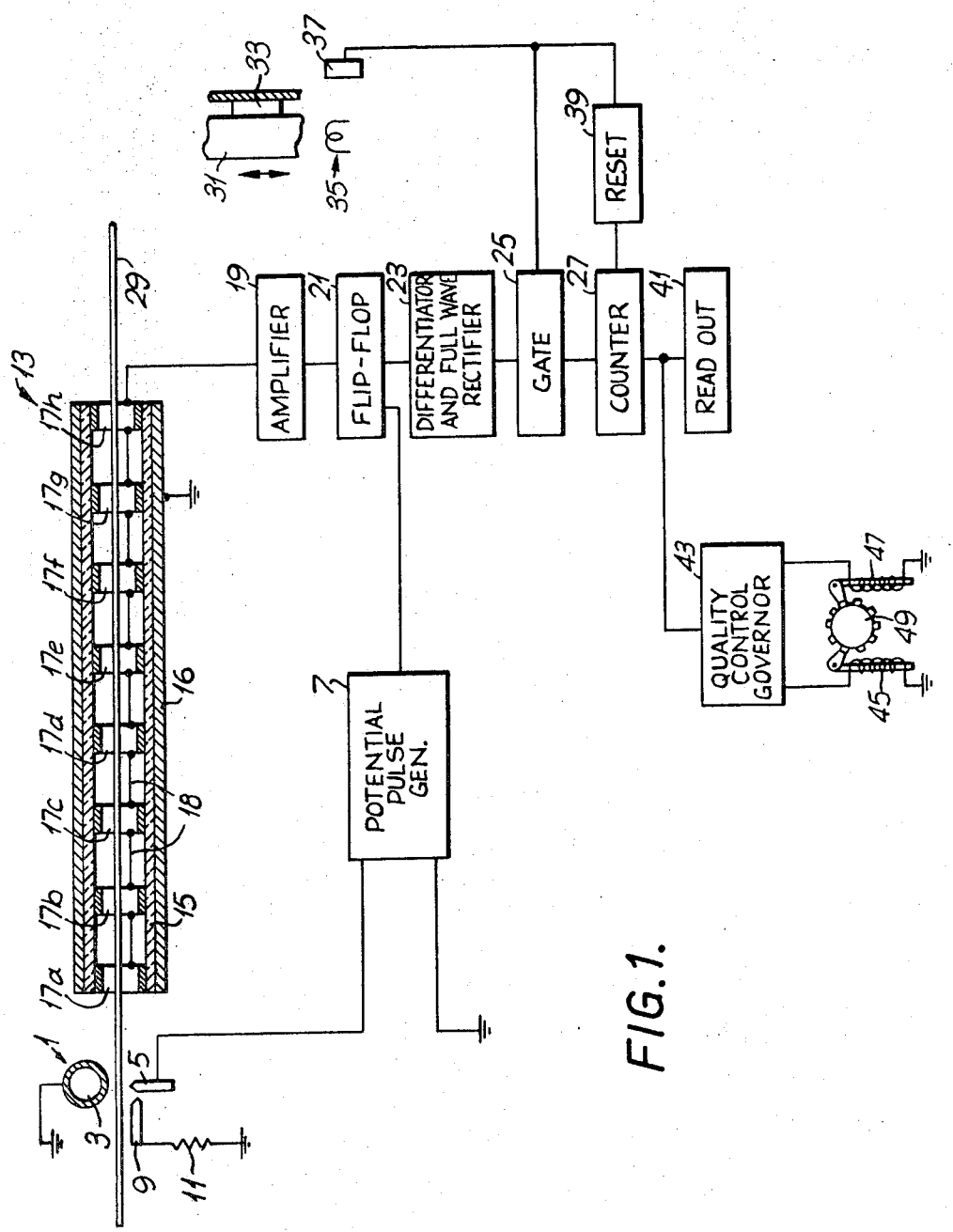
FIG. 1 illustrates a circuit for measuring the length of a stitch or the error in stitch length in a knitting machine, embodying a first form of detector.

In FIG. 1, there is illustrated a charge applicator 1, comprising an earthed cylindrical electrode 3 and a pointed electrode 5, the point of which is directed towards and spaced from the cylindrical electrode 3.

The plane containing the axis of the cylindrical electrode 3 and the tip of the pointed electrode 5 is normal to the direction of movement of the yarn between the electrodes when in operation.

The pointed electrode 5 is electrically connected to a potential pulse generator 7. A third, pointed electrode 9 has its point directed towards and spaced from the point of the first pointed electrode 5. The third pointed electrode 9 is electrically connected to earth through a resistor 11 which may have a resistance of, for example, $8m\Omega$.

A charge detector 13 of tubular form has its axis directed through the gap between the cylindrical and pointed electrodes, 3, 5. The charge detector 13 comprises a tube 15 of insulating material at the interior of which are eight discrete rings $17a-h$ of electrically-conductive material. The rings $17a-h$ are uniformly spaced along the tube 15. The distance between the plane in which lies the shortest distance between the pointed electrode 5 and the cylindrical electrode 3 and the detector ring $17a$ is equal to or is an integral multiple of the distance between adjacent detector rings $17a-h$.

The detector rings 17a—h are electrically connected by leads 18 to one another and to an amplifier 19. At the exterior of the tube 15 is a tubular sheath 16 of electrically-conductive material which is earthed.

The output of the amplifier 19 is fed to a flip-flop 21, the output of which is fed to the potential pulse generator 7 and to a differentiator and full wave rectifier 23. The output of the differentiator and full wave rectifier 23 is fed through a gate 25 to a counter 27.

The embodiment of the invention being described is intended for providing an indication of the length of a stitch or of the error in the length of a stitch knitted from a yarn 29 in a fully fashioned knitting machine.

The reference numeral 31 indicates a diagrammatically illustrated portion of the slur bar of the knitting machine. Mounted on the slur bar 31 is an opaque screen 33, which during a portion of each traverse of the slur bar 31, passes between a light source 35 and a photoelectric cell 37.

Because the screen 33 is fixedly mounted on the slur bar 31 and is of fixed and known length, the number of needles which each create a stitch during the period in which the screen obscures the light source 35 from the p.e. cell 37 as it moves between the light source 35 and the p.e. cell 37 is also known. Thus, by determining the length of yarn 29 fed during the time in which the light source 35 is obscured from the p.e. cell 37, the average length of stitches formed during that time or the average error of the length of each stitch formed during that time may be determined by dividing the length of yarn fed by the number of stitches formed.

The p.e. cell 37 is electrically connected to the gate 25 so that the signal from the differentiator and full wave rectifier 23 is only passed to the counter 27 whilst the light source 35 is obscured from the p.e. cell 37.

When the knitting machine is in operation, by the time the yarn reaches the charge detector 13, the yarn has random electrostatic charges on it even before the charge applicator 1 applies a charge on the yarn 29. Passage of such a random charge through the detector ring 17a causes a change in the potential of the detector ring 17a. This change in potential results in a current pulse which is amplified by the amplifier 19 which provides an output signal which is passed by the flip-flop 21 to the potential pulse generator 7 and triggers the generator 7 to instantaneously raise the potential of the pointed electrode 5, which causes a discrete charge to be placed on the portion of yarn at this time disposed between the pointed and cylindrical electrodes 5, 3. The potential of the pointed electrode 5 is immediately dropped so that the charged region of yarn 29 is of short length.

It has been found that by employing the third, pointed electrode 9, appropriately spaced from the first pointed electrode 5, greater reliability of charge deposition on the yarn 29 is gained. It is believed that this is because the atmosphere in the region of the first pointed electrode is ionized by discharge between the first and third, pointed electrodes 5, 9.

After the flip-flop 21 has passed a signal to the potential pulse generator 7 it prevents the transmission of a further signal to the generator 7 until a period of time has elapsed which is equal to at least half, but less than the whole of, the time which the charged region of yarn may be expected to take in travelling between the charge applicator 1 and the first detector ring 17a. After this selected off time of the flip-flop 21 has elapsed, the flip-flop 21 passes signals from the amplifier to the generator 7 and differentiator and full wave rectifier 23.

As the charged region of yarn passes through the first detector ring 17a it changes the potential of the ring 17a and the amplifier provides a signal to the generator 7 which causes application of a further charge on the yarn 29.

If the spacing between the applicator 1 and the first detector ring 17a is equal to the spacing between adjacent detector rings 17a—h, then, as the second charged region of yarn reaches the first detector ring 17a, the first charged region of yarn is passing through the second detector ring 17b.

It will be realized that after a very short period of time has elapsed after the first application of a charge, when a charged portion of yarn is passing through the first detector ring 17a, previously charged portions of yarn are passing through the detector rings 17b—h simultaneously. Thus, the total current pulse when a charged portion of yarn passes through the first detector ring may approach eight times that which would be observed if only a single detector ring 17 were to be employed. This large current pulse is advantageous in discriminating against noise due to random static on the yarn and also, should an applied charge on the yarn fail to live to a detectable extent, this will not result in the failure to deposit successive charges as would be the case if only a single detector ring were to be employed. As a dead charge region passes through a particular detector ring, seven live charges will be passing through the other rings which is quite adequate for the purpose of causing charge application by the applicator and for passing a signal onward through the differentiator and rectifier 23.

The output from the amplifier 19 is approximately sinusoidal and the output of the flip-flop 21 is a rectangular wave of the same frequency as the output of the amplifier 19. The output of the differentiator and full wave rectifier 23 is a succession of pulses of a frequency twice that of the output of the flip-flop 21.

During operation of the knitting machine, charges are continuously being applied to the yarn but because of the reciprocatory nature of the slur bar 31 and the yarn feed path to the needles, rate of yarn feed at a position where it is convenient to site the applicator 1 and detector 13 is approximately constant, and related to the rate of yarn consumption by the needles, during only a particular region of the travel of the slur cock, this region being approximately at the middle of its travel in each direction. It is arranged that the screen 33 passes between light source 35 and the p.e. cell 37 when the slur cock is at this middle region of its travel.

As the screen 33 initially obscures the source 35 from the cell 37, the gate 25 is opened and signals from the differentiator and rectifier 23 are passed to the counter 27 until light from the source 35 can again reach the cell 37 at which time the gate 25 closes.

The counter 27 counts the number of pulses received during the time in which the gate is open. The number of pulses counted during the time the gate 25 is open is related to the length of yarn which has passed the detector during the time in which the gate 25 is open because the charges are uniformly spaced by a distance equal to the distance between adjacent detector rings 17a—h.

The counter 27 applies a signal to a readout 41 which provides a visible indication either of the stitch length or of the error in stitch length, i.e. the magnitude of the departure of the actual stitch length from a required stitch length. A reset control 39 takes a signal from the p.e. cell 37 and holds the indication on the readout for as long as is required.

The adjustment of the quality control, i.e. the control governing the length of yarn in each stitch, may be made manually by an operator who is reading the readout 41 or, as in the embodiment illustrated, automatically. In the illustrated embodiment, the signal fed from the counter to the readout is applied also to a quality control governor circuit 43 which detects any discrepancy between the actual value of the output signal from the counter and the value which corresponds with the formation of stitches of correct yarn length, and applies a signal to one or the other of two solenoids 45, 47 which, through ratchet and pawl arrangements, upon energization, rotate the quality control 49 in a sense tending to return the stitch length to its correct value.

The inclusion of the differentiator and full wave rectifier 23 increases the accuracy of the device because one cycle of the square wave output signal of the flip-flop 21 appears as two pulses in the output signal of the differentiator and amplifier 23.

As mentioned above, it is arranged that the screen 33 shall pass between the source 35 and cell 37 when the rate of passage of yarn 29 through the detector is as nearly as possible equal to the rate of formation of yarn into stitches. However, equality of the two rates is not available other than instantaneously and even then the movement of the yarn may be somewhat jerky due to the elasticity of the yarn. It is therefore arranged that the counter shall, when being reset, be reset to a value, other than zero, which, in effect, adds or subtracts, as appropriate, the difference between the length of yarn formed into stitches and the length of yarn passing through the detector 13 during the time in which the screen is between the source 35 and cell 37. This difference is positive for each direction of traverse of the slur cock and the differences for the two directions of traverse can be made the same.

The embodiment of the invention described above is appropriate for determining stitch length or stitch length error in a fully fashioned knitting machine. When the invention is used in connection with a Jacquard machine, instead of the screen 33, light source 35 and p.e. cell 37 arrangement for controlling the gate 25, a microswitch may be employed which is triggered once per course of knitting.

The invention is also suitable for use as a yarn speed meter and in this case the gate 25 may be under the control of a time switch so that the counter counts for unit time and the readout gives a visual indication of length of yarn passing the detector in unit time, i.e. speed of yarn.

Figure 2:
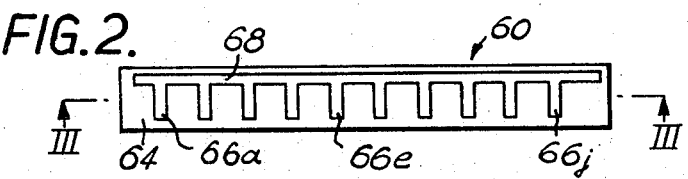
FIG. 2 illustrates a plan view of a second form of detector.
Figure 3:
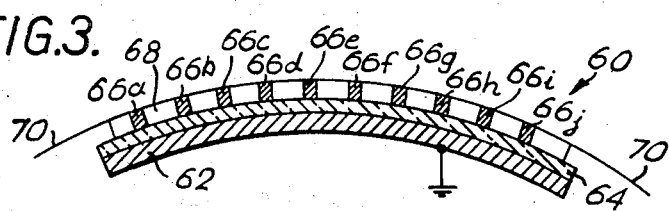
FIG. 3 illustrates a sectional view taken on the line III—III in FIG. 2.

In FIGS. 2 and 3, there is illustrated a second form of detector 60 which comprises a metal plate 62 which is arcuate in side elevation as may be seen in FIG. 3. On the convex surface of the plate 62 is a layer 64 of insulating material and on the surface of the insulating layer remote from the plate 62 are ten electrically-conductive members in the form of metal strips 66a—j which are electrically connected together by a connector strip 68. The strips 66a—j are uniformly spaced apart by a distance which is equal to or is an integral submultiple of the distance between the charge applicator and the first strip 66a.

The yarn 70 is led in an arcuate path over the strips 66a—j.

Figure 4:
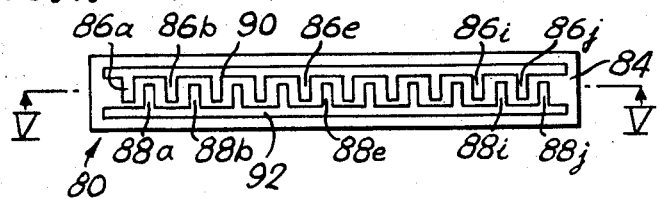
FIG. 4 is a plan view of a third form of detector.
Figure 5:
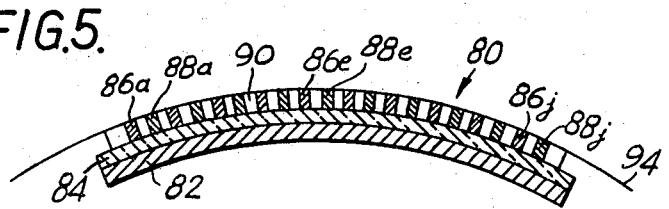
FIG. 5 illustrates a sectional view taken on the line V—V in FIG. 4.

In FIGS. 4 and 5, there is illustrated a third form of detector 80 which comprises an earthed metal plate 82 which is arcuate in side elevation as may be seen in FIG. 5. On the convex surface of the plate 82 is a layer 84 of insulating material and on the surface of the insulating layer remote from the plate 82 are two series of metal strips 86a—j and 88a—j. The members of the two series are disposed in alternate sequence and the members of each series are electrically connected by connector strips 90 and 92. The members of each series are spaced apart by a distance which is equal to or is an integral submultiple of the distance between the charge applicator and the first strip 86a and there is uniform spacing between adjacent members of the two series. As can be seen in FIG. 4 and understood from FIG. 5 the adjacent strips overlap one another when viewed in the direction of movement of the yarn 94 which is led in an arcuate path over the strips 86a—j and 88a—j.

The connector strips 90, 92 are connected to the inputs of a differential amplifier which is substituted for the amplifier 19. Only one output of the differential amplifier is used.

It will be understood that whilst the invention has been described in an embodiment for measuring yarn, the invention is also suitable for use in measuring other electrically-nonconductive materials. Also, instead of the elongate electrically-nonconductive member moving past the body having the applicator and detector, the applicator and detector may be included in a body which moves over the elongate member.

We claim:

1. A device for measuring relative movement between an elongate electrically-nonconductive member and a body, said body including:
    an applicator adapted to apply discrete regions of electrostatic charge on the elongate member;
    a charge detector disposed in applied-charge-sensing relationship with said elongate member and adapted to detect charges applied to the elongate member as they pass the detector;
    said charge detector comprising:
    a plurality of discrete electrically-conductive members uniformly spaced in the direction of relative movement;
    the distance between the charge applicator and the nearer or nearest of the electrically-conductive members being equal to or an integral multiple of the distance between adjacent said electrically-conductive members;
    means electrically interconnecting said electrically-conductive members;
    means adapted to energize said charge applicator to apply a charge upon detection of an applied charge by said detector; and
    means adapted to derive signals from the change in potential of the electrically-conductive members upon passage of applied charges past said electrically-conductive members for counting the number of charges passing the detector.

2. A device as claimed in claim 1, wherein:
    said detector is of tubular form through which said member may run, and includes;
    a tube formed of insulating material;
    an earthed sheath formed of electrically-conducting material disposed at the exterior of said tube; and
    each of said discrete electrically-conductive members including a ring coaxial with and at the interior of the tube.

3. A device as claimed in claim 2, wherein; said tube, sheath and rings are slit in a direction parallel to the axis of the tubular form of the detector whereby placement of the detector about the elongate member is facilitated.

4. A device as claimed in claim 1, wherein; said charge detector includes:
    a curved metal plate; and
    said discrete electrically-conductive members being in the form of strips disposed at the convex side of and insulated from said earth earthed metal plate.

5. A device as claimed in claim 1, wherein; said charge applicator includes:
    two spaced electrodes;
    one of said two spaced electrodes being cylindrical and earthed;
    the other of said two spaced electrodes having a point directed towards said cylindrical electrode; and
    the plane containing the cylindrical electrode and the point of said other electrode being generally normal to the longitudinal axis of the elongate electrically-nonconductive member.

6. A device as claimed in claim 5, including:
    a third electrode;
    a resistance; and
    said third electrode being connected to earth through said resistance and being disposed relative to said pointed, other electrode so that, in operation, a discharge is caused between said pointed, other and said third electrodes whereby the region of the atmosphere around the pointed, other electrode is ionized when the potential of the pointed, other electrode is raised for applying a charge.

7. A device as claimed in claim 1, wherein:
    said means adapted to derive signals from the change in potential of the electrically-conductive members includes;
    an amplifier having an input and an output;
    a counter;
    said input being connected to said electrically-conductive members; and
    said output being connected to said counter.

8. A device as claimed in claim 1, including:
    two series of said discrete electrically-conductive members;
    the members of the two series being disposed in alternate sequence;
    the members of each series being electrically connected to one another;
    a differential amplifier having two inputs and an output;
    a counter;

said two series being connected one to each of said inputs; and said output being connected to said counter.

9. A device as claimed in claim 7, including:
means, disposed between said amplifier and said counter, adapted to convert a sine wave output of said amplifier into a rectangular waveform;
means adapted to differentiate said rectangular waveform into a series of voltage pulses; and
a full wave rectifier.

10. A device as claimed in claim 7, including:
a readout;
said counter having an output; and
said output of said counter being connected to said readout.

11. A device as claimed in claim 7, including: means adapted to correct a discrepancy between the measured value and a required value, connected to said counter.

12. A device as claimed in claim 1, embodied in a fully fashioned knitting machine which includes:
a slur bar;
said device including:
a gate adapted to control the signal to the counter;
a photoelectric cell;
a light source;
an opaque screen mounted on said slur bar;
said photoelectric cell, said light source and said screen being so disposed relative to one another that said screen passes between said source and said cell during a portion of the traverse of the slur bar;
said gate being connected to said cell and adapted to open when said source becomes obscured from said cell and close when said source becomes apparent to said cell, whereby said counter only counts during the formation of a known number of stitches; and
said screen being so disposed on said slur bar that the length of yarn which passes said detector during the time in which said light source is obscured from said cell is approximately equal to the length of yarn which is formed into stitches during that time.

13. A device as claimed in claim 1, embodied in a Jacquard machine, including:
a gate,
a microswitch;
said gate being connected to said microswitch; and
said microswitch being adapted to be triggered at predetermined stages in the knitting cycle.

UNITED STATES PATENT OFFICE
CERTIFICATE OF CORRECTION

Patent No. 3,566,134          Dated February 23, 1971

Inventor(s) Derek Peat et al

It is certified that error appears in the above-identified patent and that said Letters Patent are hereby corrected as shown below:

Column 2, line 65, the value of resistor 11 which reads "8m$\Omega$" should read --8M$\Omega$--.

Signed and sealed this 16th day of April 1974.

(SEAL)
Attest:

EDWARD M. FLETCHER, JR.
Attesting Officer

C. MARSHALL DANN
Commissioner of Patents